H. A. ELEYET.
EGG CANDLER.
APPLICATION FILED MAY 5, 1915.
1,205,442. Patented Nov. 21, 1916.
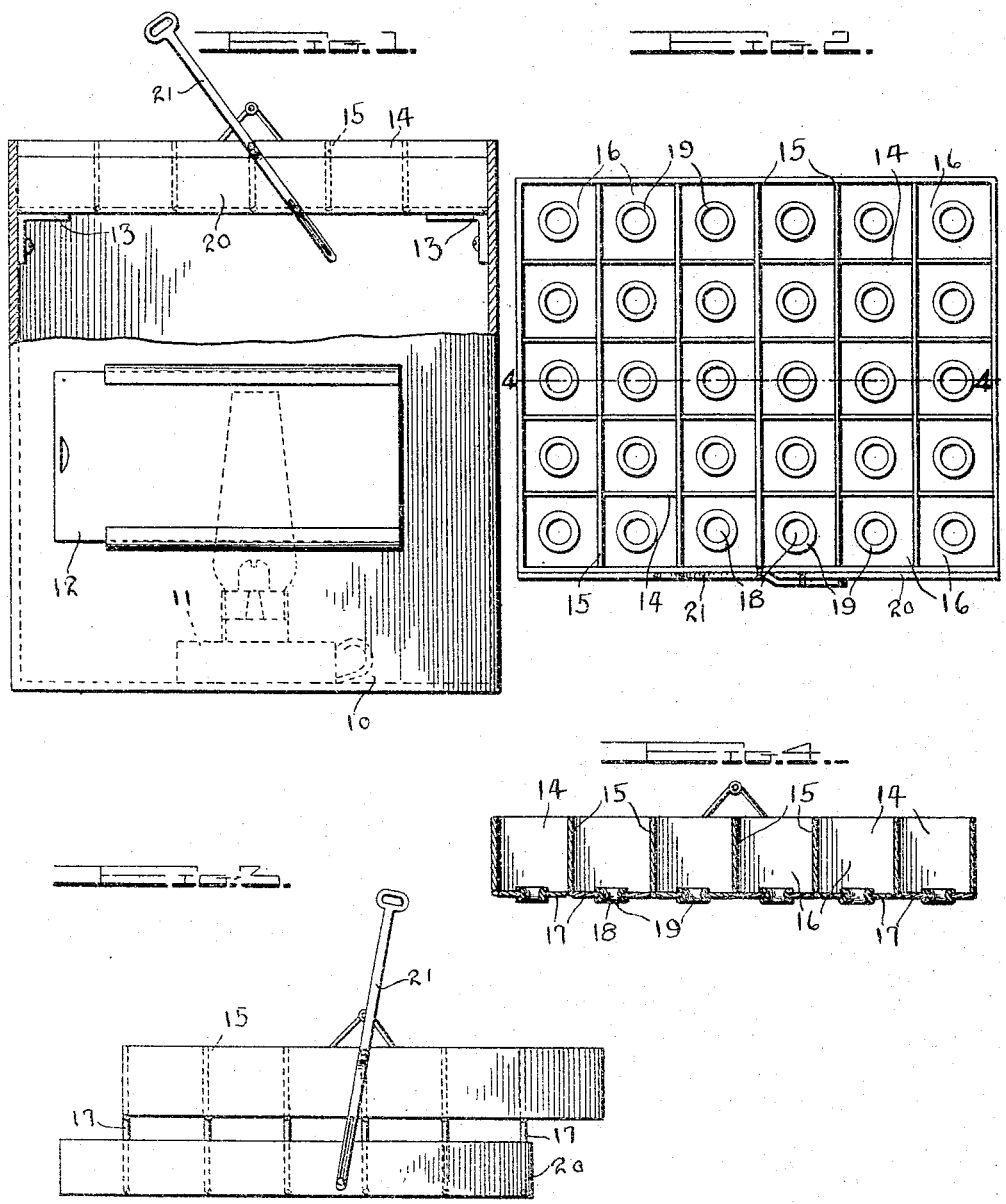
Witnesses
Wm H. Gross
Harry M. Test
Inventor
H. A. Eleyet
By Chandlee & Chandlee
Attorneys

UNITED STATES PATENT OFFICE.

HARRY A. ELEYET, OF LAKE VIEW, OHIO.

EGG-CANDLER.

1,205,442.  Specification of Letters Patent.  Patented Nov. 21, 1916.

Application filed May 5, 1915. Serial No. 26,036.

*To all whom it may concern:*

Be it known that I, HARRY A. ELEYET, a citizen of the United States, residing at Lake View, in the county of Logan, State of Ohio, have invented certain new and useful Improvements in Egg-Candlers; and I do hereby declare the following to be a full, clear, and exact description of the invention, such as will enable others skilled in the art to which it appertains to make and use the same.

This invention relates to improvements in egg candlers.

One object of the invention is to provide a novel and simple egg holder with which a large number of eggs can be candled at once.

Another object is to provide a device of this character from which the eggs can be quickly and easily removed after having been candled.

Other objects and advantages will be apparent from the following description when taken in connection with the accompanying drawing.

In the drawing: Figure 1 is an elevation of the cabinet and egg holder mounted therein, a portion of the cabinet being broken away to disclose the egg holder, Fig. 2 is a top plan view of the egg holder, Fig. 3 is an end elevation of the egg holder, and Fig. 4 is a section on the line 4—4 of Fig. 2.

Referring to the accompanying drawing, 10 represents a cabinet in which is disposed a lamp 11 and in front of which is disposed a sliding door 12 for gaining access to the lamp. In the upper portion of the cabinet are brackets or cleats 13 which are adapted to support the egg tray.

The egg tray includes a holder formed preferably of metal and consists of the longitudinal parallel strips 14 and the transverse parallel strips 15 intersecting the former to provide the egg compartments 16. Hinged to the lower edge of each of the transverse partitions 15 with the exception of one of the end partitions is a bottom member 17, each being formed with a plurality of openings 18 so formed and spaced that each of the openings will lie within one of the compartments in position to support an egg.

Each of the openings has its surrounding wall bound with rubber or other suitable soft material 19 to protect the egg. At one of the longer sides of the holder is a frame 20, the lower portion of which is pivotally connected to each of the end corners of the bottoms 17. Mounted on the upper side of the holder is a pivoted lever 21 which is also pivotally connected to the upper part of the frame 20 so that by moving the lever on its pivot all of the bottoms 17 can be swung into vertical position, to simultaneously discharge all of the eggs.

The use of the device will be obvious from the foregoing description, as it will be seen that the bottoms 17 are swung upwardly and then the holder with the eggs placed on the cleats 13. The light from the lamp 11 will shine upwardly through the openings 18 so that each egg can be rapidly viewed to tell whether the same is good or bad, or whether they are fertile or unfertile.

After the eggs have been candled, the tray is lifted out and then by rocking the lever 21 the eggs can be discharged into an egg case.

Should the eggs be candled in a light room, a hood of the common type is used.

What is claimed is:—

A device for holding eggs to be candled comprising a support provided with oppositely disposed cleats, an egg holder consisting of longitudinal and transverse interlocking partitions forming egg compartments, said holder being arranged to have the outer longitudinal partitions supported on said cleats, bottom members hinged to the lower edges of the transverse partitions and formed with a plurality of openings each adapted to be centered in the respective compartment, a frame resting against one of the outside longitudinal partitions and having the free edges of the bottom members pivotally connected thereto, said frame being adapted to rest on said cleats when the bottoms are in closed position and the holder is on the cleats whereby to hold said bottoms closed, and means carried by the holder and pivotally and slidably connected to the frame for moving the bottoms into and out of egg retaining position.

In testimony whereof I affix my signature in the presence of two witnesses.

HARRY A. ELEYET.

Witnesses:
 VERNON ELEYET,
 BERTHA C. ARMSTRONG.